INVENTOR.
GUY R. MOFFITT
BY
Shenier & O'Connor
ATTORNEYS

INVENTOR.
GUY R. MOFFITT
BY
Shenier & O'Connor
ATTORNEYS

United States Patent Office 3,281,826
Patented Oct. 25, 1966

3,281,826
NON-CONTACTING ENCODER
Guy R. Moffitt, Norwalk, Conn., assignor to United Aircraft Corporation, East Hartford, Conn., a corporation of Delaware
Filed Mar. 20, 1963, Ser. No. 266,612
7 Claims. (Cl. 340—347)

My invention relates to a non-contacting encoder and more particularly to an improved analog-to-digital converter which does not require electrical contact between relatively movable members and in which the possibility of ambiguous outputs is substantially eliminated.

Many forms of shaft position encoders are known in the prior art. The most common type of encoder is one in which a plurality of brushes usually carried by a stationary member make mechanical contact with a moving disc or the like carrying a plurality of elements of conductive material arranged in a coded pattern. In response to relative displacement between the brushes and the movable member, a digital output in some binary code is provided. Shaft position encoders of this type incorporate all the defects of any device which requires electrical contact between relatively movable members. Among these defects are that the devices have a relatively short life and owing to accumulation of dirt, very often produce unwanted outputs. Moreover, the relatively precise adjustment of parts which is required is easily disturbed.

Other types of shaft position encoders which are known in the prior art provide relatively movable members which comprise respective capacitor plates with the arrangement of plates on the members being in the form of a coded pattern. While converters of this type overcome many of the defects of converters using brushes, even this type of encoder requires that an electrical signal be applied to a movable member through the medium of relatively movable mechanically contacting elements.

I have invented a non-contacting analog-to-digital converter which requires no relatively movable electrically contacting elements whatever. My improved analog-to-digital converter overcomes the defects of converters of the prior art. I so construct my non-contacting encoder that the possibility of ambiguous outputs occurring is substantially eliminated. My non-contacting encoder is relatively simple for the result achieved thereby.

One object of my invention is to provide a non-contacting shaft position encoder which does not require relatively movable electrical contacts.

Another object of my invention is to provide a non-contacting encoder which overcomes the defects of encoders of the prior art employing brushes.

A further object of my invention is to provide a non-contacting encoder which overcomes the defects of capacitive encoders of the prior art.

Still another object of my invention is to provide a non-contacting analog-to-digital converter in which the possibility of the occurrence of an ambiguous output is substantially eliminated.

A still further object of my invention is to provide a non-contacting analog-to-digital converter which is relatively simple for the result achieved thereby.

Other and further objects of my invention will appear from the following description.

In general my invention contemplates the provision of a shaft position encoder including a plurality of saturable readout cores arranged in rows of pairs corresponding respectively to output bits in various places of significance in the output representation. These cores are mounted for relative movement with respect to a coded member which is either magnetic material formed with a coded pattern of windows or a member carrying coded magnetized areas. The two cores of the row corresponding to the least significant bit form a magnetic flip-flop to provide the least significant output bit. The control currents of cores of lesser significance are used to control switching between the cores of rows of greater significance to avoid the possibility of the occurrence of output ambiguities.

In the accompanying drawings which form part of the instant specification and which are to be read in conjunction therewith and in which like reference numerals are used to indicate like parts in the various views.

Figure 1:
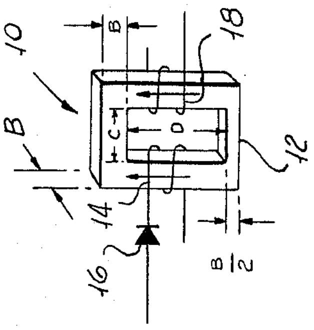
FIGURE 1 is a perspective view of one form of saturable core which I may employ in my non-contacting encoder.

Referring now to the drawings, FIGURE 1 illustrates one form of readout core indicated generally by the reference character 10 which I may employ in my encoder. The core 10 is formed from any suitable high-permeability material such, for example, as a ferrite which has a core flux versus ampere turn characteristic similar to that for hi-$\mu$ 80 material. The core 10 is generally square in cross-sectional area except that its bottom leg 12 has a thickness which is less than that of the other legs. For example, in FIGURE 1, I have illustrated a core having window dimensions C x D and having a square cross-sectional area for all save the base leg 12. If the dimension of one side of the square cross-sectional area is B, then for example the dimensions of the leg 12 may be B x B/2.

In general, each core 10 included in my converter has an input winding 14 to which a carrier signal, to be described hereinafter, is applied through a diode 16 and a control winding 18. It will readily be apparent from the windings 14 and 18 shown in FIGURE 1 that the two windings are oppositely polarized. Now if a carrier signal is applied through the diode 16 to the winding 14, a flux, the direction of which is indicated by the arrow passing axially through the winding 14 in FIGURE 1, will be produced. With no signal on winding 18 then core 12 quickly saturates and a relatively large current passes through winding 14. If now a current is applied to winding 18 in a direction to produce a flux, the direction of which is indicated by the arrow passing axially through winding 18 in FIGURE 1, then the carrier signal applied to winding 14 through rectifier 16 will not saturate the core and the current through winding 14 will be relatively small.

A third situation which, as will be described hereinafter, exist in my converter is the presence of additional magnetic material adjacent the leg 12. When this occurs and with no current flow through winding 18, there is sufficient magnetic material in the flux path to prevent the carrier signal from saturating the core. Alternatively, rather than positioning magnetic material adjacent the leg 12 there could be provided a coded magnetized member generating such a flux as will cause the carrier signal to saturate the core by crowding the flux lines in one leg of the core.

Figure 2:
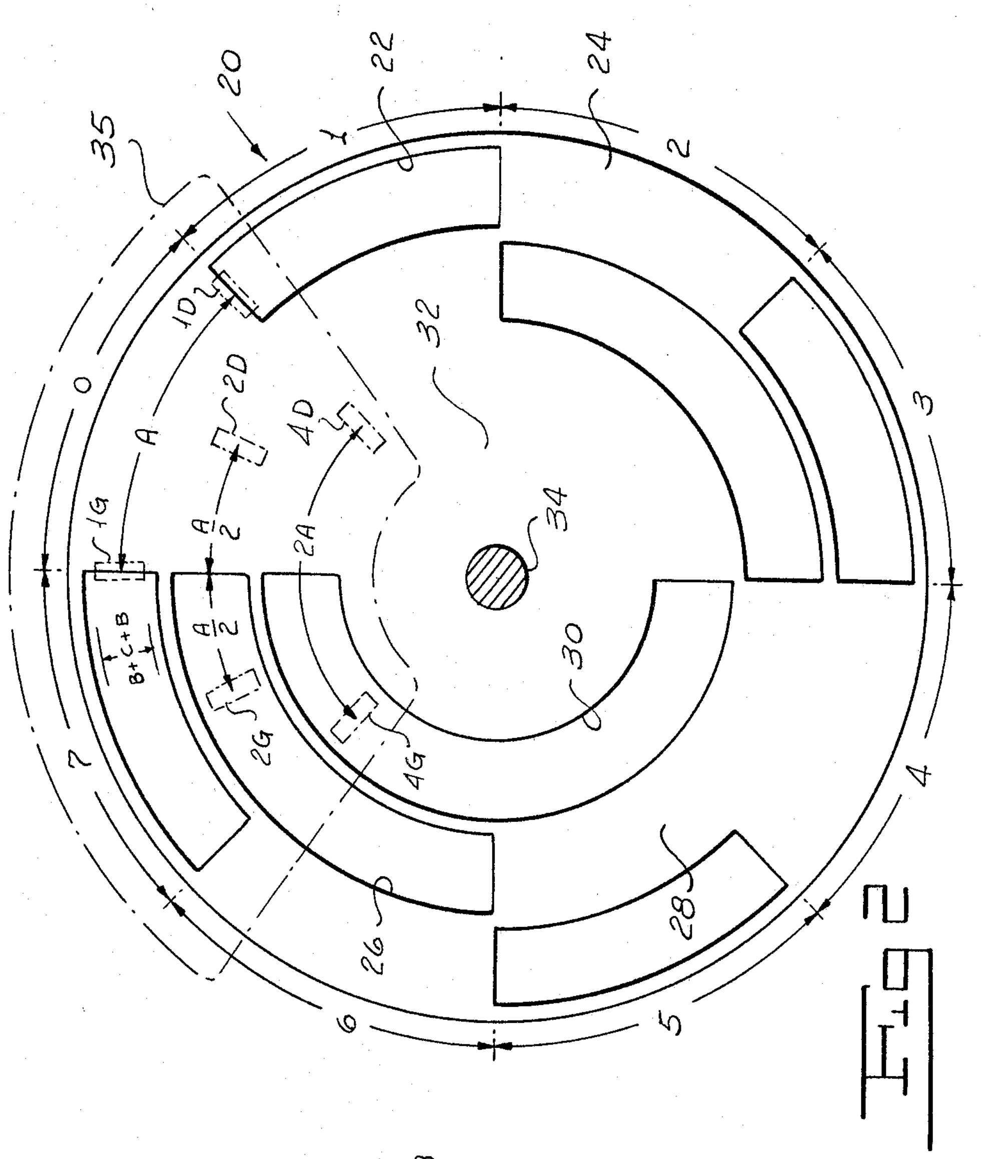
FIGURE 2 is a plan view of one form of coded member which I may employ in my non-contacting encoder.

Referring now to FIGURE 2, one form of coded member which I employ in my non-contacting encoder is a disc indicated generally by the reference character 20 of a magnetic material similar to that of which the cores 10 are formed. This disc may have a thickness equal to B/2 for example. I form the disc 20 with a first circular track made up alternately of windows 22 formed in the disc and spaces 24 between adjacent windows. The track along which windows 22 and spaces 24 are disposed is the least significant bit track of the form of my encoder illustrated in the drawings. A second track made up of windows 26 separated by spaces 28 forms the next-to-least significant track of my encoder. The most significant track includes a window 30 and a space 32.

While I have shown only three tracks for purposes of simplicity in exposition, it will readily be apparent that I can employ as many tracks as are necessary to produce the required digital representation. Preferably the disc 20 of my encoder is the movable member. For this reason I mount disc 20 on the shaft 34, the position of which is to be represented for movement therewith. Adjacent the periphery of the disc 20 in FIGURE 2, I have indicated the output count provided for each segment of the disc. In the particular form of the invention shown in the drawings, only seven output counts are provided. By analogy, it will be apparent that as many output positions as desired may be provided. Further while I have shown a disc 20 of magnetic material in which windows are formed, I can as well provide a disc having magnetized areas corresponding to the windows illustrated in FIGURE 2.

As is pointed out hereinabove, there are two cores 10 associated with each of the tracks formed by the windows and spaces in FIGURE 2. One of each of the pairs of cores is a lead core while the other is a lagging core. I have indicated the cores associated with the tracks in phantom in FIGURE 2 and have shown the cores as being carried by a stationary member 35 with reference to which shaft 34 rotates. For purposes of clarity, I have indicated the respective lead and lag cores associated with the track formed by windows 22 and spaces 24 by the reference characters 1D and 1G. Similarly, the respective cores associated with the next-to-least significant track formed by windows 26 and spaces 28 are indicated by the reference character 2D for the lead core and 2G for the lag core. The two cores associated with the most significant track are indicated respectively by the reference characters 4D and 4G.

I space the two cores 1D and 1G associated with the least significant bit track by a distance A which is equal to the span of one window 22 or of one space 24 in FIGURE 2. As will be apparent from the description hereinafter, core 1G comprises the reference core of my analog-to-digital converter. I dispose the cores 2D and 2G corresponding to the next-to-least significant bit symmetrically about a radius passing through core 1G with a distance A between the cores. Similarly I dispose cores 4D and 4G symmetrically about a radius passing through core 1G with a distance 2A between the cores. As more and more tracks are provided, the tolerances for the tracks of greater significance are sufficient to permit the cores associated therewith to be spaced by a distance which is less than a multiple of two of the distance separating the cores associated with the track of next lesser significance.

As will readily be apparent, each of the windows 22, 26 and 30 has a dimension which is greater than the length of a leg 12 of a core 10 or greater than B+C+B.

Figure 3:
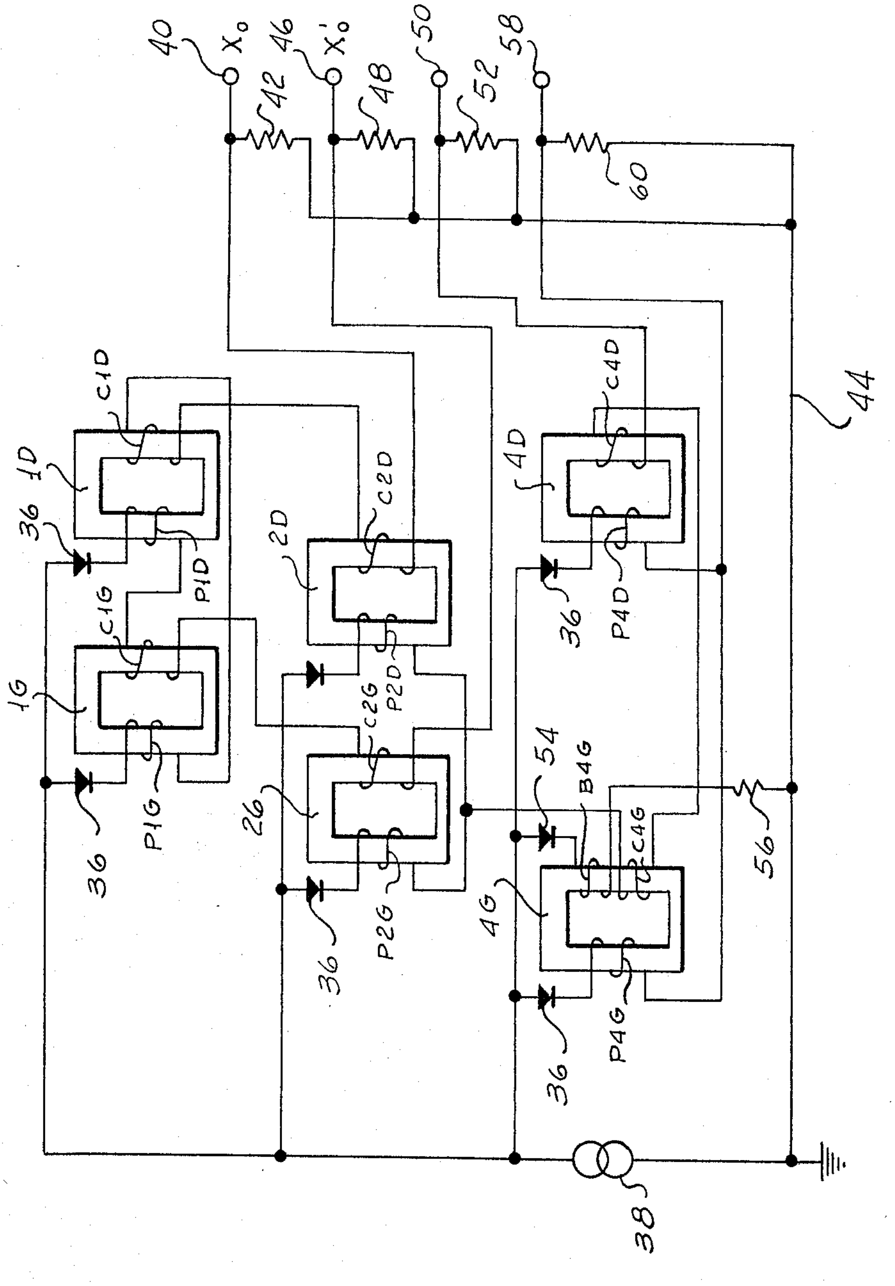
FIGURE 3 is a schematic view of the arrangement of readout cores which I employ in connection with the form of coded member illustrated in FIGURE 2.

Referring now to FIGURE 3, I have shown the interconnections of the various core windings of my non-contacting encoder. For purposes of clarity, I have indicated one winding of each core by the prefix P indicating that it is a power winding and I have indicated the control winding with the prefix C. Thus, for example, core 1G carries a power winding P1G and a control winding C1G. This arrangement follows through my converter with the exception that core 4G carries a biasing winding B4G. A plurality of diodes or rectifiers 36 connect a source of carrier voltage 38 to each of the power windings of the cores of my converter. It is to be noted that frequency of the carrier signal provided by the source 38 should be at least twice the least significant bit frequency at the highest slew rate for which the converter is designed.

The first two cores 1D and 1G of my converter form a magnetic flip-flop. I connect the winding P1G of core 1G in series with the control winding C1D of core 1D and in series with control winding C2D of core 2D to an output terminal 40 connected by a resistor 42 to the ground conductor 44 of my system. Similarly I connect the power winding P1D, the control winding C1G and the control winding C2G in series to a terminal 46 connected by a resistor 48 to ground conductor 44. By way of illustrating the flip-flop characteristic of the cores 1D and 1G, assume for example that a space 24 is under core 1D while a window is under the core 1G. Under these conditions core 1G saturates with the result that winding P1G passes a relatively large current. This current also flows through winding C1D. Owing to the polarization of the winding C1D, this current generates an unsaturating flux in core 1D to ensure that the core will not saturate. At the same time the current flows through winding C2G to terminal 46 to indicate a binary "1" at that terminal. Thus terminal 46 provides the complement of the least significant bit output which I have indicated by the reference character $X_0'$. This arrangement is such that the conditions described are maintained until a space 24 comes under the core 1G. When this occurs, core 1G unsaturates and the unsaturating flux produced by winding C1D rapidly falls to zero to permit winding 1D to saturate. Now when winding 1D saturates, winding P1D carries a relatively large current which passes through winding C1G to generate an unsaturating flux therein. This triggering action takes place very rapidly so that the states of the two cores change quickly as a window leaves core 1G. It will be appreciated that at the same time a window is going under core 1D to enhance this action. After the triggering action, the relatively large current through winding P1D passes through the resistor 42 to produce the representation of a 1 at terminal 40 which carries the least significant bit representation $X_0$.

From the description thus far it will be clear that the two cores 1D and 1G associated with the least significant bit track form a magnetic flip-flop which ensures rapid and accurate switching between the cores at the ends of the windows 22.

The output currents from the cores 1D and 1G are used to control switching between the cores 2D and 2G associated with the bit track of next greater significance. It will be remembered that the current flowing through winding P1D flows also through control winding C2G and that the current flowing through winding P1G flows also through winding C2D. Currents through windings C2G and C2D produce unsaturating fluxes in the respective cores. These unsaturating fluxes prevent the cores from saturating even though a window be present under the core.

I connect winding C4G and C4D in series between the common output of windings P2G and P2D and an output terminal 50 connected to ground conductor 44 by an output resistor 52. I connect a crystal or diode 54 in series with a biasing winding B4G on core 4G and a resistor 56 in series across the source 38. The polarity of winding B4G is such that a current normally flowing through the winding produces an unsaturating flux which tends to prevent saturation of core 4G even though a window be present under this core. Winding C4G has such a polarity that it produces a flux tending to saturate core 4G. Owing to this arrangement core 4G is biased to unsaturated state and a control current through winding C4G produces a flux which overcomes this bias to permit core 4G to saturate in response to the presence of a window below the core. Winding C4D has a polarity such that a current through this winding produces a flux tending to unsaturate core 4D. As will be apparent from the description given hereinafter, these arrangements ensure that transfer between the cores of greater significance occurs at the proper points and that no ambiguous outputs occur.

I connect the outputs of windings P4G and P4D to an output terminal 58 which is connected to ground conductor 44 by an output resistor 60.

The operation of my encoder in producing a natural binary-coded representation of the angular position of shaft 34 with respect to support 35 can best be understood by reference to Table I below.

put from windings P2G and P2D so that no flux flows through winding C4G tending to overcome the bias provided by winding B4G. Thus even though there is a window below core 4G it will not saturate owing to the biasing flux produced by winding B4G. At the same time the current through winding C4D is relatively low so that no unsaturating flux is produced by this winding. However, owing to the presence of disc material below core 4D, it will not saturate. Under these conditions, since neither winding P2G nor P2D produces an output the representation of a "0" appears at terminal 50. Similarly, neither

TABLE I

| Int. | 1D | P1D | C1D | 1G | P1G | C1G | 2D | P2D | C2D | 2G | P2G | C2G | 4D | P4D | C4D | 4G | P4G | B4G | C4G | $X_4$ | $X_2$ | $X_1$ | $X'_1$ |
|---|---|---|---|---|---|---|---|---|---|---|---|---|---|---|---|---|---|---|---|---|---|---|---|
| 0-½ | w | on | - | i | off | u | i | off | - | w | off | u | i | off | - | w | off | u | - | 0 | 0 | 0 | 1 |
| ½-1 | w | on | - | i | off | u | i | off | - | i | off | u | i | off | - | w | off | u | - | 0 | 0 | 0 | 1 |
| 1-1½ | i | off | u | w | on | - | i | off | u | i | off | - | i | off | - | i | off | u | - | 0 | 0 | 1 | 0 |
| 1½-2 | i | off | u | w | on | - | w | off | u | i | off | - | i | off | - | i | off | u | - | 0 | 0 | 1 | 0 |
| 2-2½ | w | on | - | i | off | u | w | on | - | i | off | u | i | off | u | i | off | u | s | 0· | 1 | 0 | 1 |
| 2½-3 | w | on | - | i | off | u | w | on | - | w | off | u | i | off | u | i | off | u | s | 0 | 1 | 0 | 1 |
| 3-3½ | i | off | u | w | on | - | w | off | u | w | on | - | w | off | u | i | off | u | s | 0 | 1 | 1 | 0 |
| 3½-4 | i | off | u | w | on | - | i | off | u | w | on | - | w | off | u | i | off | u | s | 0 | 1 | 1 | 0 |
| 4-4½ | w | on | - | i | off | u | i | off | - | w | off | u | w | on | - | i | off | u | - | 1 | 0 | 0 | 1 |
| 4½-5 | w | on | - | i | off | u | i | off | - | i | off | u | w | on | - | i | off | u | - | 1 | 0 | 0 | 1 |
| 5-5½ | i | off | u | w | on | - | i | off | u | i | off | - | w | on | - | w | off | u | - | 1 | 0 | 1 | 0 |
| 5½-6 | i | off | u | w | on | - | w | off | u | i | off | - | w | on | - | w | off | u | - | 1 | 0 | 1 | 0 |
| 6-6½ | w | on | - | i | off | u | w | on | - | i | off | u | w | off | u | w | on | u | s | 1 | 1 | 0 | 1 |
| 6½-7 | w | on | - | i | off | u | w | on | - | w | off | u | w | off | u | w | on | u | s | 1 | 1 | 0 | 1 |
| 7-7½ | i | off | u | w | on | - | w | off | u | w | on | - | i | off | u | w | on | u | s | 1 | 1 | 1 | 0 |
| 7½-0 | i | off | u | w | on | - | i | off | u | w | on | - | i | off | u | w | on | u | s | 1 | 1 | 1 | 0 |

In the table I have indicated half intervals over a complete revolution of the shaft 34. The presence of a window below a particular core is indicated by "*w*" while the absence of a window is indicated by "*i*." Where a power winding carries a relatively heavy current I have indicated this fact by the word "on" for the winding. The word "off" indicates that the current through a power winding is relatively low indicating a zero in the binary code. Where any one of the control windings C1D, C1G, C2D, C2G or C4D produces an unsaturating flux, I have indicated this fact by the letter "*u*." The letter "*s*" indicates that winding C4G generates a saturating flux tending to overcome the biasing unsaturating flux produced by winding B4G.

Let us consider the operation of the system in a number of specific angular positions of the shaft 34. As has been pointed out hereinabove, core 1G is a reference core which indicates the angular position of the shaft. With the shaft in the zero to one-half interval, core 1G has no window therebelow so that it is unsaturated and a relatively low current flows through windings P1G, C1D and C2D to represent a "0" at terminal 40. At the same time there is a window below core 1D with the result that this core saturates and a relatively large current flows through windings P1D, C1G and C2G to produce a representation "1" at terminal 46 which is complementary to the output at terminal 40. In this position of the shaft, core 1G not only is unsaturated by reason of the presence the disc material therebelow but, also, the relatively large current through winding C1G holds it in the unsaturated state. Conversely, the current through winding C1D is relatively low so that no unsaturating flux is generated in this core. These conditions prevail until the window 22 under core 1D leaves the core at the transfer point from 0 to 1.

Still considering the zero to one-half interval, it will be seen that no window is below core 2D so that even though there is no unsaturating flux through winding C2D this core 2D will be unsaturated. At the same time there is a window below core 2G so that it tends to saturate. However, the relatively large current through winding C2G produces an unsaturating flux which prevents core 2G from saturating. Under these conditions there is no output from winding P4G nor winding P4D produces an output and the representation of a "0" appears at terminal 58. Consequently, in the zero position of shaft 34, a representation of 0000 is provided.

It will be apparent from the description given above that for the interval considered, core 2G would normally tend to produce a 1 output but is forced to provide a 0 output by the unbiasing flux from the output of the preceding track. Similarly core 4G which would tend to produce a 1 in the output is forced to the 0 state by the unsaturating biasing flux.

Considering as another example the relative position of shaft 34 in the interval 7 to 7½, in this position core 1G has a window therebelow so that it saturates and a relatively large current flows through windings P1G, C1D and C2D to represent a 1 at terminal 40. The unbiasing flux in core 1D holds this core in the unbiased state until the window moves out from under the core 1G. In this position a window is under both cores 2G and 2D. Since there is no unsaturating flux generated by winding C2G, the core 2G is permitted to saturate to produce an output. Even through there is a window below core 2D the unsaturating flux generated by winding C2D prevents core 2D from saturating and this core produces no output. The output from winding P2G passes through windings C4G and C4D to provide the representation of a 1 at terminal 50.

In this position of the shaft 34 under consideration, the relatively large current through winding C4G produces a flux tending to saturate the core. This flux overcomes the unsaturating bias provided by winding B4G to permit core 4G to saturate. Owing to the fact that in this relative position of the shaft 34 there is window 30 under core 4G, the core can saturate to permit winding P4G to produce an output representing a 1 at terminal 58. At the same time the current through winding C4D produces an unsaturating flux tending to unsaturate core 4D.

The conditions of the various cores for the other positions of shaft 34 can readily be determined by following the system through in the manner described above. All the conditions are illustrated in Table I above. For purposes of simplicity and to clarify the logical arrangement of my converter, Table II below indicates the state of the cores for the various positions represented.

TABLE II

| I | 1D | 1G | 2D | 2G | 4D | 4G | $X_1$ | $X_1'$ | $X_2$ | $X_4$ |
|---|---|---|---|---|---|---|---|---|---|---|
| 0 | 1 | 0—0 | 0 | 1═0<br>0—0 | 0 | 1═0 | 0 | 1 | 0 | 0 |
| 1 | 0—0 | 1 | 0—0<br>1═0 | 0 | 0 | 0—0 | 1 | 0 | 0 | 0 |
| 2 | 1 | 0—0 | 1 | 0—0<br>1—0 | 0—0 | 0 | 0 | 1 | 1 | 0 |
| 3 | 0→0 | 1 | 1—0<br>0—0 | 1 | 1═0 | 0 | 1 | 0 | 1 | 0 |
| 4 | 1 | 0—0 | 0 | 1═0<br>0—0 | 1 | 0—0 | 0 | 1 | 0 | 1 |
| 5 | 0—0 | 1 | 0—0<br>1═0 | 0 | 1 | 1—0 | 1 | 0 | 0 | 1 |
| 6 | 1 | 0—0 | 1 | 0—0<br>1—0 | 1—0 | 1 | 0 | 1 | 1 | 1 |
| 7 | 0—0 | 1 | 1—0<br>0—0 | 1 | 0—0 | 1 | 1 | 0 | 1 | 1 |

In this table the arrows indicate the presence of a control flux tending to unsaturate a core. In those places in which the double arrows appear this unsaturating flux affects the readout of the device. Thus, it is in these instances where the system prevents ambiguities in the output.

It will be seen that I have accomplished the objects of my invention. I have provided a non-contacting analog-to-digital converter which overcomes the defects of converters of the prior art. My analog-to-digital converter does not require the use of any relatively movable contacts whatever. It achieves this result while preventing possible ambiguities in the output reading. My system is relatively simple for the result achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a magnetic flip-flop a pair of cores, input windings carried respectively by said cores, control windings carried respectively by said cores, the input and control windings of each core being arranged to produce oppositely directed flux in the core, a source of voltage, means connecting the input winding of one core and the control winding of the other core in series across said source, and means connecting the input winding of the other core and the control winding of the one core in series across said source.

2. A magnetic encoder including in combination a coded member comprising a plurality of groups of areas alternately of diverse magnetic characteristics, said groups corresponding respectively to output places of significance from least significant to most significant, respective pairs of saturable pickoff devices associated with said groups, means for mounting the coded member and said pickoff devices for relative movement, said pair of pickoff devices corresponding to the least significant group forming a flip-flop whereby said devices alternately produce output currents, and means for applying said output currents to the pickoff devices corresponding to groups of greater significance to control the saturation thereof.

3. A magnetic encoder including in combination a coded member comprising a plurality of groups of areas alternately of diverse magnetic characteristics, said groups corresponding to output places of significance from least significant to most significant, respective pairs of pickoff devices associated with said groups, each of said pickoff devices comprising a core and an input winding carried thereby, a source of voltage, means coupling said source to said input windings, each of said cores being adapted to saturate under the action of said voltage in response to the presence adjacent thereto of an area of one of said characteristics and to remain unsaturated under the action of said voltage in response to the presence adjacent thereto of an area of the other characteristic, the current flow through the input winding of a core being relatively large when the core is saturated and relatively small when the core is unsaturated, means responsive to the input winding currents of cores corresponding to places of lesser significance for controlling the saturation of cores corresponding to places of greater significance, and means mounting said member and said cores for relative movement.

4. A magnetic encoder including in combination a coded member comprising a plurality of groups of areas alternately of diverse magnetic characteristics, said groups corresponding to output places of significance from least significant to most significant, respective pairs of pickoff devices associated with said groups, each of said pickoff devices comprising a core provided with an input winding and a control winding, a source of voltage, means coupling said source to said input windings, each of said cores being adapted to saturate under the action of said voltage in response to the presence adjacent thereto of an area of one of said characteristics and to remain unsaturated in response to the presence adjacent thereto of an area of the other characteristic, the current flow through the input winding of a core being relatively large when the core is saturated and relatively small when the core is unsaturated, means mounting said member and said devices for relative movement, means interconnecting the input and control windings of the pickoff devices corresponding to the least significant place to form a magnetic flip-flop whereby the respective input windings alternately carry large currents as the corresponding group of areas on said member move relative thereto, means for coupling the input winding currents of said least significant place cores to the control windings of the cores corresponding to the next-to-least significant place to control the saturation of said next-to-least significant place cores, and means for coupling the input winding currents in the next-to-least significant place cores to the control windings in the place of next greater significance to control the saturation of the cores in the place of next greater significance.

5. In an encoder a coded member comprising areas of diverse magnetic characteristics, sensing means comprising a core and an input winding carried by the core, a source of voltage, means for applying said voltage to said input winding, means for applying a control flux to said core, said core being adapted to saturate under the action of said voltage in response to the presence adjacent thereto of an area having one of said diverse characteristics in the absence of a control flux and to remain unsaturated under the action of said voltage in response to the presence adjacent thereto of an area having the other of said diverse characteristics, means mounting said coded member and said core for relative movement, said control flux preventing said core from saturating under the action of said voltage even in response to the presence adjacent thereto of an area having said one characteristic.

6. A magnetic encoder including in combination a coded member comprising a first and a second and a third row of areas alternately of diverse magnetic characteristics, respective pairs of sensing devices corresponding to said rows, each of said sensing devices comprising a core carrying an input winding and a control winding, a source of voltage, means for applying said voltage to said input windings, each of said cores being adapted to saturate under the action of said voltage in response to the presence adjacent thereto of an area having one of said diverse characteristics and to remain unsaturated under the action of said voltage in response to the presence adjacent thereto of an area having the other of said diverse characteristics, the current flow through the input winding of a core being relatively large when the core is saturated and relatively small when the core is unsaturated, means mounting the coded member and the core for relative movement, means interconnecting the input and control windings of the cores associated with the first row to form a magnetic flip-flop, means for applying the input winding current of the cores associated with the first row respectively to the control windings of the cores associated with the second row to control the points at which the second row cores saturate and an OR circuit for applying the input winding currents of the second row cores to the control windings of the third row cores.

7. An encoder including in combination a coded member comprising a first and a second and a third row of areas alternately of diverse magnetic characteristics, respective pairs of sensing devices corresponding to said rows, each of said sensing devices comprising a core carrying an input winding, a source of voltage, means for applying said voltage to said input windings, each of said cores being adapted to saturate under the action of said voltage in response to the presence adjacent thereto of an area having one of said diverse characteristics and to remain unsaturated under the action of said voltage in response to the presence adjacent thereto of an area having the other of said diverse characteristics, the current flow through the input winding of a core being relatively large when the core is saturated and relatively small when the core is unsaturated, means mounting said coded member and said cores for relative movement, means responsive respectively to the input winding currents of the first row cores for generating unsaturating fluxes in the second row cores, means for producing a biasing unsaturating flux in one of the third row cores and means responsive to both the second row input winding currents for generating a saturating flux in said one third row core and an unsaturating flux in the other third row core.

References Cited by the Examiner

UNITED STATES PATENTS

| | | | |
|---|---|---|---|
| 2,802,953 | 8/1957 | Arsenault et al. | 307—88 |
| 3,170,154 | 2/1965 | Fleming | 340—347 |

OTHER REFERENCES

Electronic Design: Shaft Encoder, April 13, 1960 (pp. 108–109 relied on, copy in Scientific Library).

MAYNARD R. WILBUR, *Primary Examiner.*

MALCOLM A. MORRISON, DARYL W. COOK, *Examiners.*

K. R. STEVENS, *Assistant Examiner.*